Sept. 14, 1943.   H. E. IMES   2,329,377
DISCHARGE APPARATUS
Filed June 7, 1941   2 Sheets-Sheet 1
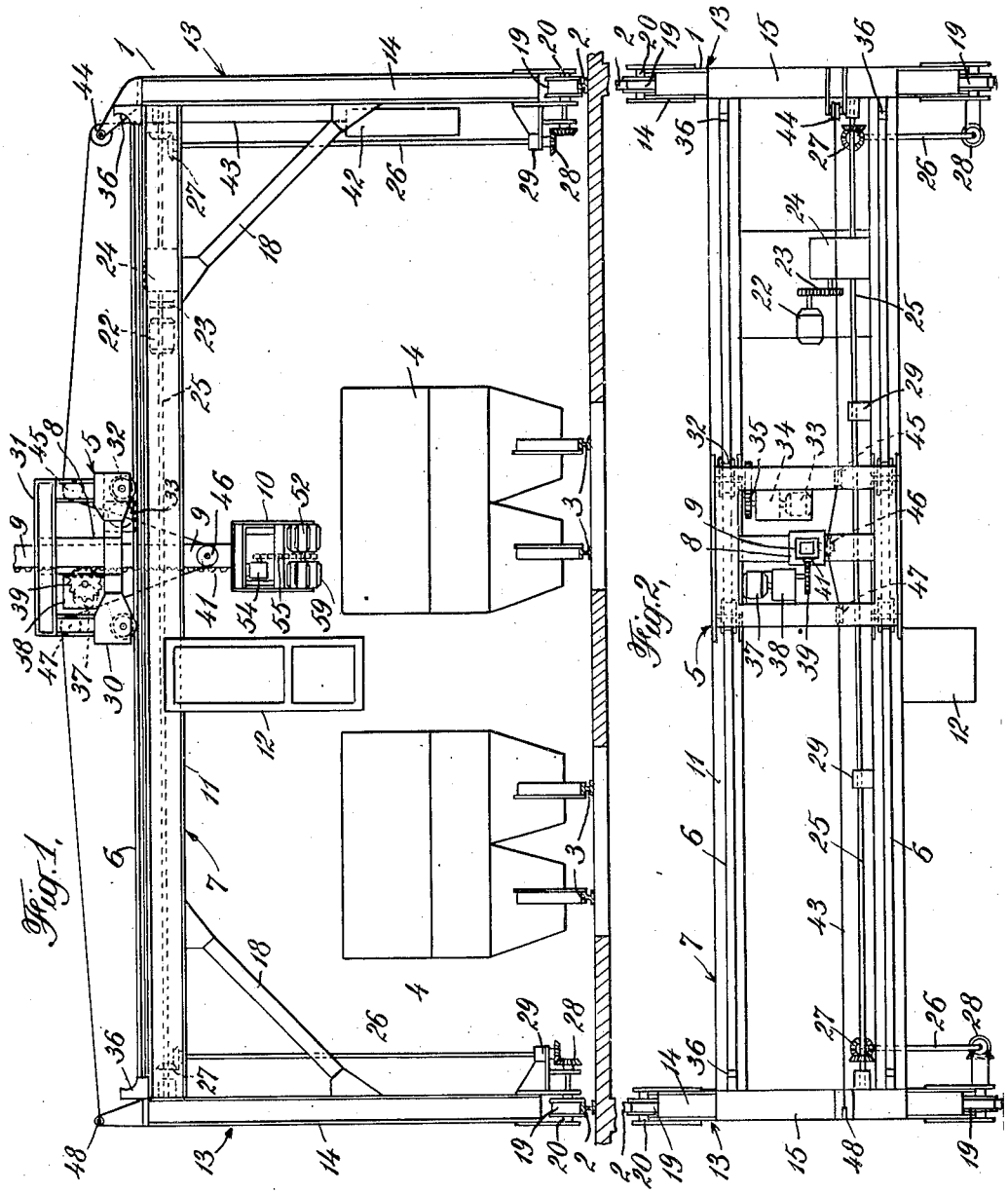
INVENTOR
Harold E. Imes
BY
Benjamin Sweedler
ATTORNEY Sept. 14, 1943.　　　　H. E. IMES　　　　2,329,377
DISCHARGE APPARATUS
Filed June 7, 1941　　　2 Sheets-Sheet 2
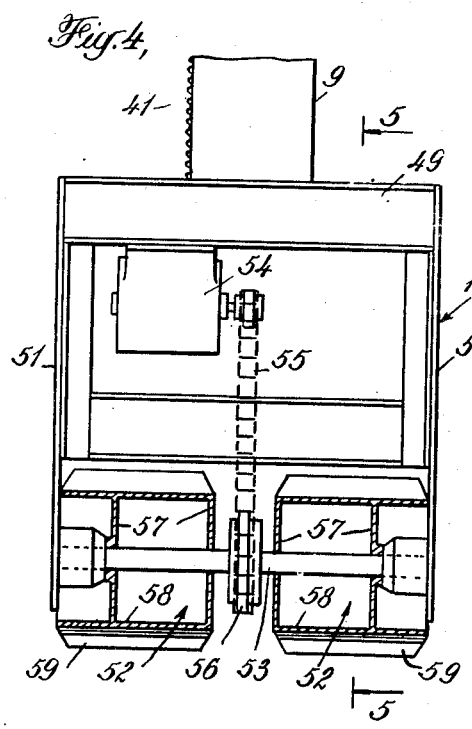
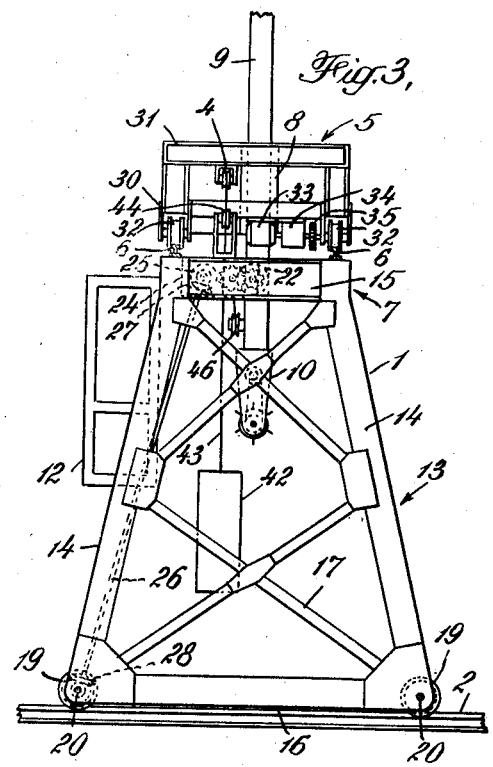
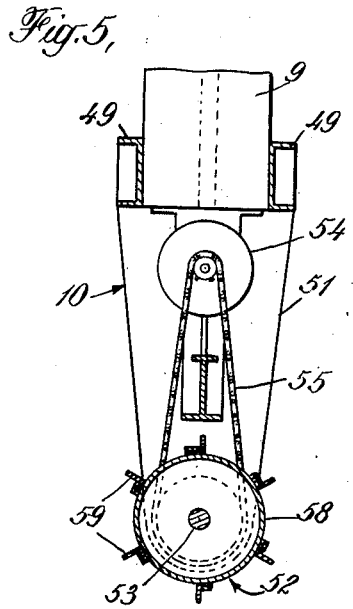
INVENTOR
Harold E. Imes
BY
Benjamin Smedler
ATTORNEY Patented Sept. 14, 1943

2,329,377

UNITED STATES PATENT OFFICE 2,329,377

DISCHARGE APPARATUS

Harold Everett Imes, Ironton, Ohio, assignor to Semet-Solvay Company, New York, N. Y., a corporation of New York Application June 7, 1941, Serial No. 396,995

4 Claims. (Cl. 214—44)

This invention relates to apparatus for the removal of bulk material from bottom discharge hoppers and more particularly to apparatus suitable for use to expedite discharging material from hopper bottom railroad cars and for cleaning the interior of such cars.

When bulk material, e. g., coal, is discharged from hopper bottom cars, some of the material invariably remains in the car. This residual material has heretofore been removed by sledging the car with a heavy hammer, or by poking the material. These operations are time-consuming and involve a considerable cost for labor. Furthermore, such operations are dangerous because of the hazard attendant to lack of secure footing available on the steep slopes of car hoppers. The expenditure of time and labor for removing residual material is particularly high where the material in the car is wet or frozen or has become packed for some other reason.

It is an object of the present invention to provide a machine to facilitate removal of material from a hopper and effect a clean removal of substantially all material from the hopper.

The apparatus of my invention involves a material-digging and moving head at the end of a rigid arm, a support holding the arm against angular movement, and motors connected to move the arm up and down, laterally, and longitudinally relative to the hopper containing the material, to bring the material-digging and moving head to any point within the hopper. The material-digging and moving head preferably involves a brush having radial fins or projections rotatable about a horizontal axis and mounted at the lower end of the rigid arm so that the brush is always lowermost, in position to dig and move material when the arm is lowered to bring the member into contact with the material.

In a preferred embodiment illustrated in the drawings, the invention is shown in a form adapted for use in unloading hopper bottom railroad cars. In this form, the arm carrying the material-moving and digging head is slidably mounted in a guide fixed to a crane trolley. The crane trolley is carried by a travelling crane movable in a path lengthwise of a hopper bottom railroad car to be unloaded, the trolley being movable along the bridge portion of the crane in a path at right angles to the path of the crane. The present description will be confined to the present illustrated embodiment of the invention, but it will be understood that the novel features and improvements are susceptible of other applications such, for example, as apparatus for use in unloading stationary hoppers. Hence, the scope of this invention is not confined to the embodiment herein described.

In the drawings,

Fig. 1 is an end elevation of a preferred embodiment of my invention and shows the material-moving and digging head in position to be lowered to aid in discharging material from a hopper bottom car;

Fig. 2 is a plan view of the apparatus of Fig. 1;

Fig. 3 is a side elevation of the apparatus of Fig. 1;

Fig. 4 is a fragmentary end elevation, partly in section, on a larger scale, of the material-moving and digging head; and Fig. 5 is a vertical section taken on the line 5—5 of Fig. 4.

Referring to Figs. 1, 2 and 3, crane 1 is movable on tracks 2 disposed on a concrete foundation and parallel to the tracks 3 for hopper cars 4 to be unloaded. The crane 1 carries a trolley 5 which is movable along the tracks 6 on the bridge portion 7 of crane 1. A guide 8 is fixed on trolley 5; a rigid arm 9 having a discharge head 10 at its lower end is slidably mounted for movement up and down within this guide.

The crane 1 is of conventional type involving a horizontal bridge portion 7 constituted of I-beams 11, control cab 12 suspended from the beams 11, and end members 13. The end members 13, as shown in Fig. 3, comprise legs 14, top connecting members 15, bottom connecting members 16, and bracing members 17, extending between the legs 14. Bracing members 18 (Fig. 1) are connected between the end members 13 and the bridge portion 7.

The crane 1 moves on flanged wheels 19 which roll on tracks 2, the axles 20 of the wheels 19 being journalled near the ends of the bottom connecting members 16. Crane 1 is propelled along the tracks 2 lengthwise of car 4 by a reversible motor 22 connected to drive wheels 19. As shown in the Figs. 1 to 3, the driving connection involves spur gears 23 between motor 22 and a speed reducer 24, horizontal shaft 25 driven by the speed reducer 24, downwardly extending shafts 26 at each end of the crane, and miter gears 27 and 28 which transmit power respectively from shaft 25 to shafts 26 and from shafts 26 to the axles 20 of the wheels 19. Suitable bearings 29 are provided for the shafts 25 and 26.

Crane trolley 5 carried by the crane 1 involves a rectangular lower frame 30 and an upper frame 31 constructed of suitable channel bars or I-beams. The guide 8 is fixed between these two frames. Mounted on the lower frame are the flange wheels 32 engaging the track 6 for moving the crane trolley 5 in a direction parallel to the width of the cars 4. Movement of the crane trolley is effected by reversible motor 33 on the frame 30, which motor is connected to drive the wheels 32 through a speed reducer 34 and spur gears 35. To prevent the crane trolley 5 from running off the ends of the track 6 there are provided stops or bumpers 36.

Arm 9 is a rigid beam slidable up and down in guide 8, but held by the guide against angular movement. Reversible motor 37 on the frame 30 is connected to raise or lower arm 9 through speed reducer 38 and gear 39 which engages rack 41 on the arm 9. A counterweight 42 for arm 9 is suspended from one end of a cable 43. The cable passes over a pulley 44 at one end of the crane I, over pulley 45 on the trolley 5, under pulley 46 near the lower end of arm 9 and over a second pulley 47 on the trolley 5. The other end 48 of the cable 43 is fastened adjacent the other end of the crane I. By this arrangement, the weight of arm 9 is counterbalanced, but movement of the trolley 5 along the bridge of the crane does not necessitate a corresponding movement of the counterweight 42.

Discharge head 10 (see Figs. 4 and 5) mounted at the lower end of the arm 9 comprises a pair of cross pieces 49 fixed to the lower end of arm 9, side plates 51 secured to the cross pieces 49, and cylindrical brush members 52 mounted on a horizontal shaft 53 journalled in side plates 51. Motor 54, secured to the end of arm 9, drives the brush members 52 through a chain 55 passing around a gear wheel 56 on the shaft 53. The brush members 52 comprise disks 57 fixed to the shaft 53, cylindrical members 58 fixed to the periphery of the disks 57, and a plurality of radially extending flexible fins 59, which are preferably of rubber, secured to the cylindrical portions.

The operation of my apparatus for unloading a hopper bottom car may be as follows:

Motor 22 is operated to move crane I along tracks 2 to a position where the bridge portion 7 is above a hopper bottom car 4 to be unloaded. The bottom of the car 4 is then opened to permit discharge of material if it has not already been opened. Motor 33 is operated to move trolley 5 along tracks 6 to a position above the car 4; motor 54 is started, to rotate the brush member 52; and motor 37 is operated to lower arm 9 to bring the discharge head 10 into engagement with material in the hopper car. The fins 59 of the brush member 52 operate to dig and move the material within the car to loosen it up and expedite discharge from the car. As the discharge of material progresses the operator in cab 12 actuates any or all of motors 22, 33, and 37 to obtain movement of discharge head 10 respectively lengthwise of the car, crosswise of the car, or up and down within the car, so that the discharge head may be brought into all corners of the car to loosen up the material and to clean out material which may be lodged in the corners and move it towards the hopper discharge. The flexible fins 59, it will be observed, in effect wipe material adhering to the inclined or bottom walls of the hopper and propel this material, thereby insuring complete discharge of material and resulting in a clean interior.

It will be understood that suitable and well known controllers such as switches may be disposed in the cab 12 for controlling the flow of current to the motors 22, 33, 37 and 54. The operator in the cab 12 by opening or closing these switches can actuate any desired motor and thus effect the desired movement of crane I, trolley 5, arm 9, and the material-moving and digging brushes 52. Since the cab 12 is disposed so that the operator has a clear view of the entire interior of the hopper 4 he can regulate the operation of the apparatus to effect a complete discharge of its contents and, if desired, to clean the walls and floor of the hopper. In those cases in which initial discharge of material takes place readily, the apparatus of this invention may be employed to remove residual material such as coal adhering to the walls of the hopper after the bulk of the material has been discharged therefrom.

It will be noted the apparatus of my invention is simple yet highly maneuverable so that it can be operated to facilitate discharge of material from a hopper and can be readily controlled so as to reach into all parts of the hopper to remove material cleanly from all corners thereof without the necessity for manual operations, i. e. sledging or poking heretofore required. Moreover, the flexible fins of the discharge head do not dent or chip paint from the car as does sledging.

It is to be understood that this invention is not restricted to the present disclosure otherwise than as defined by the appended claims.

I claim:

1. Apparatus for assisting in the discharge of bulk material from a hopper bottom car, which comprises a rigid arm, a discharge head comprising substantially radial rubber fins rotatable about a horizontal axis mounted at the end of the arm, said rubber fins being capable of exerting a wiping action on the floor of said hopper, means to rotate the fins, a guide holding the arm against angular movement, means to move the arm up and down in the guide, and means to move the guide laterally which comprises a crane movable on tracks parallel to the length of the hopper bottom car, and having a bridge member supported at a level above the level of the top of the car, a crane trolley by which the guide is carried movable along the bridge of the crane at right angles to the path of movement of the crane, whereby the discharge head may be brought to any point within a hopper to assist in the discharge of material therefrom, a counterweight and cable means connected to said counterweight and crane and cooperating with said trolley and arm to counterbalance said arm and discharge head at any position of said trolley.

2. Apparatus for assisting in the discharge of bulk material from a hopper bottom car, which comprises a rigid arm, a discharge head comprising a substantially cylindrical member with radially projecting flexible fins on its periphery, said fins extending on said cylindrical member in spaced relation in a direction parallel to its axis, said cylindrical member being mounted for rotation about a horizontal axis at the end of the arm, a motor to rotate the cylindrical member, a guide holding the arm against angular movement, a second motor to move the arm up and down in the guide, a crane movable on tracks parallel to the length of the hopper bottom car, a third motor for moving said crane, a crane trolley carrying the guide and movable along the crane at right angles to the path of movement of the crane, a fourth motor for moving said crane trolley, and a counterweight mounted on said crane for counterbalancing said arm and discharge head during vertical and horizontal movement thereof.

3. Apparatus for assisting in the discharge of material from a hopper comprising in combination a support, means for moving said support up and down within a hopper, material-engaging means carried by the support for engaging material lodged within said hopper and dislodging it from the walls and floor of said hopper, said last mentioned means comprising flexible fins mounted radially about a horizontal axis and extending in a direction substantially parallel to said axis, means for rotating said fins about the horizontal axis to exert a wiping action on the floor of said hopper and means for moving said support and the material-engaging means carried thereby both longitudinally and transversely of the hopper so as to dispose the material-engaging means at any desired point within said hopper.

4. Apparatus for assisting in discharge of bulk material from hoppers which comprises a rigid vertically-movable arm, a discharge head comprising a substantially cylindrical member having flexible radial fins disposed in spaced relation on its periphery, said fins extending on said cylindrical member in spaced relation in a direction parallel to its axis, said cylindrical member being mounted for rotation about a horizontal axis at the end of the arm, means carried by the arm to rotate the cylindrical member, a guide holding the arm against angular movement, means to move the arm vertically up and down, and means to move the arm laterally whereby the discharge head may be brought to any point within a hopper to assist in the discharge of material therefrom.

HAROLD EVERETT IMES.